(12) United States Patent
Hatti

(10) Patent No.: US 11,444,784 B2
(45) Date of Patent: Sep. 13, 2022

(54) SYSTEM AND METHOD FOR GENERATION AND VERIFICATION OF A SUBJECT'S IDENTITY BASED ON THE SUBJECT'S ASSOCIATION WITH AN ORGANIZATION

(71) Applicant: Ajitkumar Dhanraj Hatti, Pune (IN)

(72) Inventor: Ajitkumar Dhanraj Hatti, Pune (IN)

(*) Notice: Subject to any disclaimer, the term of this patent is extended or adjusted under 35 U.S.C. 154(b) by 180 days.

(21) Appl. No.: 16/779,972

(22) Filed: Feb. 3, 2020

(65) Prior Publication Data

US 2020/0295948 A1     Sep. 17, 2020

(30) Foreign Application Priority Data

Mar. 12, 2019   (IN) .............................. 201921009590

(51) Int. Cl.
*H04L 9/32*   (2006.01)
*H04L 9/08*   (2006.01)
*H04L 9/00*   (2022.01)
*G06Q 20/32*  (2012.01)

(52) U.S. Cl.
CPC ....... *H04L 9/3249* (2013.01); *G06Q 20/3276* (2013.01); *H04L 9/006* (2013.01); *H04L 9/0861* (2013.01); *H04L 9/3213* (2013.01); *H04L 9/3297* (2013.01)

(58) Field of Classification Search
CPC ... H04L 9/3249; H04L 9/3213; H04L 9/0861; H04L 9/006; H04L 9/3297; G06Q 20/3276

USPC .......................................................... 713/176
See application file for complete search history.

(56) References Cited

U.S. PATENT DOCUMENTS

| 6,185,682 | B1* | 2/2001 | Tang ....................... G06F 21/31 |
| | | | 380/262 |
| 6,381,629 | B1* | 4/2002 | Lee ......................... G06F 16/20 |
| | | | 709/201 |
| 10,225,255 | B1* | 3/2019 | Jampani ................... G06F 21/44 |
| 2018/0011692 | A1* | 1/2018 | Ross ...................... H04L 9/0662 |

* cited by examiner

*Primary Examiner* — Bryan F Wright
(74) *Attorney, Agent, or Firm* — Ulmer & Berne LLP

(57) ABSTRACT

The present disclosure relates to the field of identity generation and verification systems and discloses a system and a method for generation and verification of identity of a subject associated with an organization. The system comprises an identity generation tool, an identity verification tool, and a validating server. The identity generation tool is installed in a first electronic device associated with the subject and is configured to generate an ephemeral identity instance for the subject based on its association record, a digital signature of the association record, and a one-time token. The identity verification tool is installed in a second electronic device associated with the verifier and is configured to receive the identity instance and verify the association record of subject using the digital signature. The validating server is configured to verify the validity status of the association record.

12 Claims, 10 Drawing Sheets

SYSTEM AND METHOD FOR GENERATION AND VERIFICATION OF A SUBJECT'S IDENTITY BASED ON THE SUBJECT'S ASSOCIATION WITH AN ORGANIZATION

FIELD

The present disclosure relates to identity generation and verification systems. More particularly, the present disclosure relates to a system and method for generation and verification of a subject's identity based on its association and status of association with an organization.

DEFINITIONS

As used in the present disclosure, the following terms are generally intended to have the meaning as set forth below, except to the extent that the context in which they are used indicate otherwise.

Subject—The term "subject" hereinafter refers to a person or a machine such as a vending machine, a drone, a vehicle, an unmanned vehicle, and a robot which needs to be identified securely and reliably.

Association record—The term "association record" hereinafter refers to information describing association of the subject of the present disclosure with an organization. The association record is created, received, and maintained as an asset by the organization.

Verifier—The term "verifier" hereinafter refers to a person, organization, or machine that can establish correctness and validity of the association record of the present disclosure.

Digital signature—The term "digital signature" hereinafter refers to a mathematical scheme for verifying the authenticity of digital messages or documents.

One-time token—The term "one-time token" hereinafter refers to a dynamic password or PIN that is valid for only one login session or transaction, on a computer system or other digital device.

Head shot—The term "Head shot" hereinafter refers to a promotional photograph of someone's face that is used as a professional profile image on social media, the 'about us page' or a corporate website.

BACKGROUND

The background information herein below relates to the present disclosure but is not necessarily prior art.

People regularly need to prove their identity or verify the identity of other people to carry out business in a secured and trusted manner. The traditional instruments used for identity assertion and verification are not foolproof and are susceptible to forgery and social engineering attacks. These instruments come with privacy concerns if lost or shared with malicious users. Traditionally, printed instruments like identity cards, with a subject's head shot, duly signed and stamped by concerned authority are used as identity instruments. Such identities are part of utility or permit that is provided by a governing body, like Passport, Driving permit, voter identity card and the like. Another set of identities are provided by authorities of institutions to which subject belongs. Such identity instruments are created to be verified by humans and in some cases by machines as well. However, they have following shortcomings:

Head shots and validity dates can be tampered with to create forged identity cards;

Printed identity instruments can be duplicated without authorization;

Forged, unauthorized, or duplicated copies of these identity instruments cannot be identified by visual inspection;

Printed identity instruments can only be verified by people belonging to the issuer organization or the governing body; and These identity instruments cannot be updated once printed and are hard to revoke.

To overcome these drawbacks, RFID based access cards are commonly used nowadays. RFID based cards with subject's head shot printed on it is are used for controlling access to a premise. Such identities are machine verifiable, but have the following limitations:

RFID based access cards can be easily cloned and bypassed;

Their usage is restricted, as organizations other than the issuer cannot use them to verify the identity of a subject;

They cannot be updated once printed; and

They are expensive.

Some other identity instruments used conventionally, include, Password or biometric based access control systems, Visiting cards, and Login facility by scanning QR code. Access control to a premise or a safe is managed by passwords which can be a combination of numbers, or biometric features like fingerprint or retina scan. In this case the person himself is his own identity. However, these systems face following disadvantages:

People are hesitant to give their biometric details due to privacy concerns;

Only machine verification is possible;

These systems are prone to high rates of verification failure; and

Biometric parameters like fingerprints of a victim can be collected and replayed, subject's voice can be mimicked, and facial recognition systems can be tricked.

Visiting cards are the weakest forms of identity instruments and have following limitations:

It is simple to make unauthorized copies of visiting cards;

Visiting cards are difficult to verify;

Genuine cards can be circulated and used by others without subject's permission or knowledge; and The information obtained from these cards needs to be digitized or the card needs to be carried all time.

Furthermore, login facility for a service that involves scanning a QR code using a mobile phone, is tightly coupled with the service provider. This mechanism cannot be used to access other services, which is not desired.

Therefore, there is felt a need to provide a system for generation and verification of identity that eliminates the above-mentioned drawbacks.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a system for generation and verification of identity.

Another object of the present disclosure is to provide a system for generation of identity that is non-forgeable.

Still object of the present disclosure is to provide a system for generation of identity whose unauthorized duplication is not possible.

Yet another object of the present disclosure is to provide a system for generation of identity which is universally verifiable.

Still another object of the present disclosure is to provide a system for generation and verification of identity that allows easy updation of a subject's identity.

Yet another object of the present disclosure is to provide a system for generation and verification of identity that allows the subject to protect his/her identity.

Still another object of the present disclosure is to provide a system for generation and verification of identity that is cost-effective.

Yet another object of the present disclosure is to provide a system for verification of identity that is fast and accurate.

Still another object of the present disclosure is to provide a system for verification of identity that has minimum failure rate.

Yet another object of the present disclosure is to provide a system for generation of identity that can be used for logging in to any platform which can verify the subject's credentials.

Other objects and advantages of the present disclosure will be more apparent from the following description, which is not intended to limit the scope of the present disclosure.

SUMMARY

The present disclosure envisages a system for generation and verification of identity of a subject associated with an organization. The system comprises an identity generation tool, an identity verification tool, and a validating server. The identity generation tool is installable in a first electronic device associated with the subject and is configured to facilitate generation of an ephemeral identity instance for the subject upon receiving a request for identity verification from a verifier. The identity generation tool comprises a first repository and an identity generation module. The first repository is configured to store subject's association record, a digital signature of the association record, and a secret value associated with the subject. The association record of the subject includes ID of the organization, user ID of the subject, and association details of the subject with the organization. The identity generation module comprises a first token generator module and a combining module. The first token generator module is configured to cooperate with the first repository to receive the secret value, and is further configured to feed the secret value and the current timestamp to a pseudo random number generator as a seed to generate a first one-time token. The combining module is configured to cooperate with the first repository and the first token generator module to receive and combine the association record, the digital signature, and the first one-time token to generate the identity instance for the subject.

The identity verification tool is installable in a second electronic device associated with a verifier. The second electronic device comprises a first transceiver configured to receive the identity instance from the first electronic device. The identity verification tool is configured to perform a first level authentication of the subject. The identity verification tool comprises a second repository, a first extractor module, a second extractor module, a first crawler and extractor module, a decrypting module, a digital signature verification module, and validity status requesting module. The second repository is configured to store a first lookup table having a list of organizations IDs and associated public keys. The first extractor module is configured to cooperate with the first transceiver to receive the identity instance, and is further configured to extract the association record, the digital signature, and the first one-time token from the identity instance. The second extractor module is configured to cooperate with the first extractor module to receive the extracted association record, and is further configured to extract organization ID of the subject from the received association record. The first crawler and extractor module is configured to cooperate with the second extractor module to receive the organization ID of organization associated with the subject, and is further configured to crawl through the first lookup table of the second repository to extract the public key of the organization. The decrypting module is configured to cooperate with the first crawler and extractor module and the first extractor module to receive the extracted public key and the extracted digital signature respectively, and is further configured to decrypt the digital signature using the public key to generate a decrypted data. The digital signature verification module is configured to cooperate with the decrypting module and the first extractor module to receive the decrypted data and the association record for the subject respectively, and is further configured to compare the decrypted data with hash values of the association record to verify the digital signature. The validity status requesting module is configured to generate a validity status request upon successful verification of the digital signature, and is further configured to cooperate with the first and second extractor module to transmit the organization ID, the user ID, the first one-time token, and the validity status request to a validating server via the first transceiver for verifying the current status of the association record. In an embodiment, the first extractor module, the second extractor module, the first crawler and extractor module, the decrypting module, the digital signature verification module, and the validity status requesting module are implemented using one or more processors.

The validating server is communicatively coupled with the identity generation tool, the identity verification tool, and an identity server associated with the organization. The validating server is configured to perform a second level authentication of the subject and comprises a database, a second transceiver, a second crawler and extractor module, a second token generator module, and a comparator. The database is configured to store a second lookup table having a list of organization IDs, user IDs of subjects associated with the organizations having said organization IDs, and secret values associated with said subjects. The second transceiver is configured to receive the validity status request, the organization ID, the user ID, and the first one-time token from the validity status requesting module. The second crawler and extractor module is configured to cooperate with the second transceiver to receive the organization ID and user ID of the subject, and is further configured to cooperate with the database to crawl through the second lookup table and extract secret value associated with the organization ID and user ID. The second token generator module is configured to cooperate with the second crawler and extractor module to generate a second one-time token using the current time stamp and the extracted secret value. The comparator is configured to cooperate with the second token generator module and the second transceiver to receive the second one-time token and the first one-time token respectively, and is further configured to compare the second one-time token with the first one-time token to verify the validity status of the association record. The comparator is also configured to communicate the validity status to the identity verification tool via the second transceiver. In an embodiment, the second crawler and extractor module, the second token generator module, and the comparator are implemented using one or more processors.

In an embodiment, the identity instance is generated in the form of a QR code. The second electronic device includes a scanning unit configured to scan the QR code to receive the identity instance.

In another embodiment, the first electronic device is configured to transmit the generated identity instance in the form of wireless signals. The first transceiver is a wireless signal receiver selected from the group consisting a Bluetooth transceiver, a Wi-Fi transceiver, a LTE transceiver, an Ultra Wide Band transceiver, an Infrared transceiver, and a WiMAX transceiver.

In an embodiment, the second electronic device is configured to display digital signature verification and validity status of the subject to the verifier.

In an embodiment, the identity server is configured to store of a list of associated subjects, user IDs and association record of each of the subjects, secret values associated with each user ID, and head shots or photographs of each of the subjects.

In an embodiment, the validating server is further configured to obtain head shot or photograph of the subject from the identity server to facilitate a third level identity verification of the subject.

The present disclosure also envisages a method for generation and verification of identity of a subject using the system described above.

BRIEF DESCRIPTION OF THE ACCOMPANYING DRAWING

A system for generation and verification of identity of a subject of the present disclosure will now be described with the help of the accompanying drawing, in which.

LIST OF REFERENCE NUMERALS

100—System
102—First electronic device
104—Identity generation tool
106—Organization
106a—Identity server
108—Second electronic device
110—Identity verification tool
112—Validating server
202—First repository
204—Identity generation module
206—First token generator module
208—Combining module
302—First transceiver
304—First extractor module
306—Second extractor module
308—First crawler and extractor module
310—Decrypting module
312—Digital signature verification module
314—validity status requesting module
316—Second repository
402—Second transceiver
404—Database
408—Second crawler and extractor module
410—second token generator module
412—comparator

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, steps, elements, modules, units and/or components, but do not forbid the presence or addition of one or more other features, steps, operations, elements, components, and/or groups thereof. The particular order of steps disclosed in the method of the present disclosure is not to be construed as necessarily requiring their performance as described or illustrated. It is also to be understood that additional or alternative steps may be employed.

The terms first, second, third, etc., should not be construed to limit the scope of the present disclosure as the aforementioned terms may be only used to distinguish one element or component from another element or component. Terms such as first, second, third etc., when used herein do not imply a specific sequence or order unless clearly suggested by the present disclosure.

Figure 1:
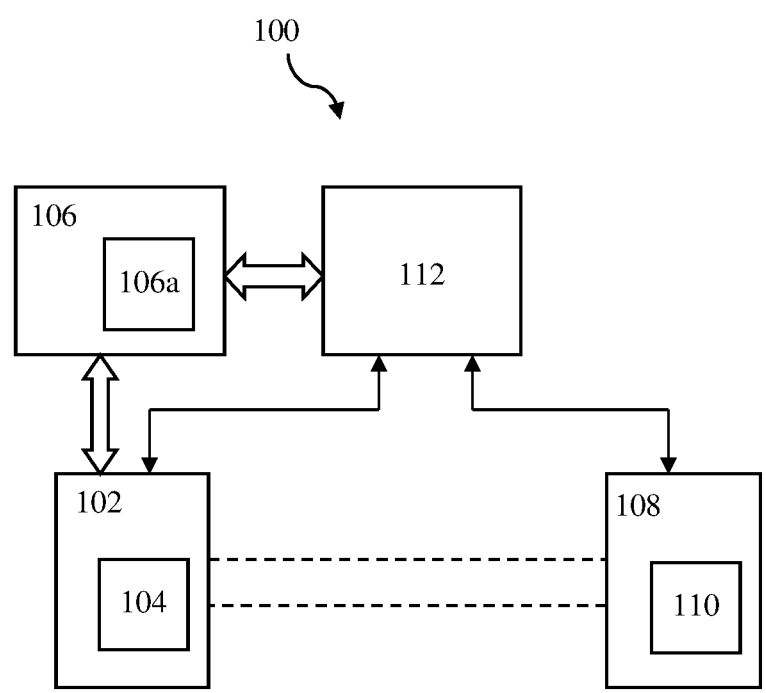
FIG. 1 illustrates a block diagram of a system for generation and verification of identity.
Figure 2:
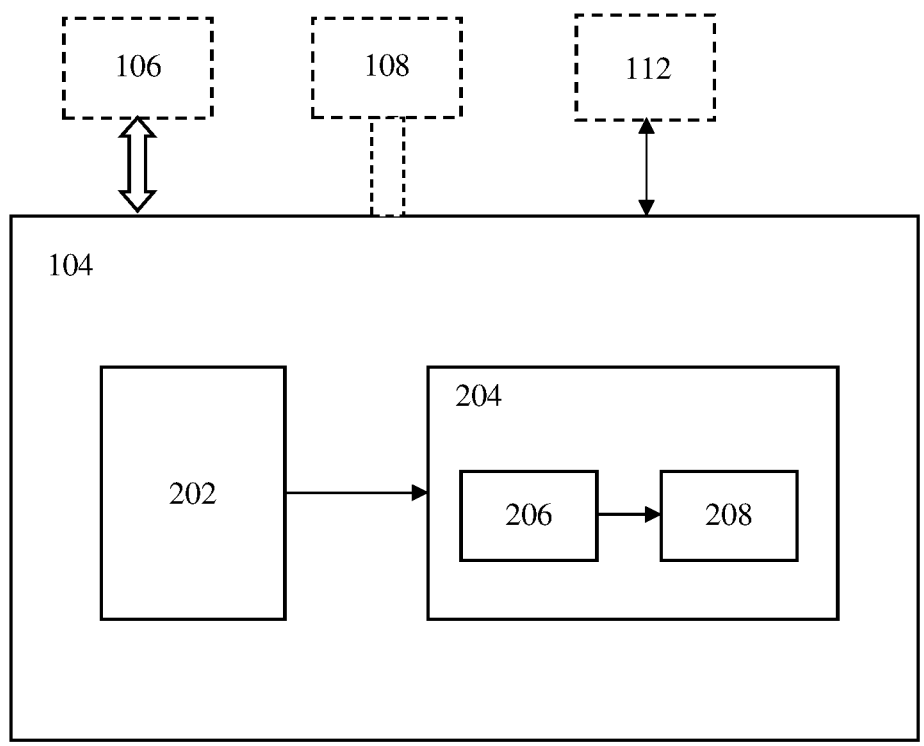
FIG. 2 illustrates a block diagram of an identity generation tool of the system of FIG. 1.

A system for generation and verification of identity (hereinafter referred as "system 100") of the present disclosure is now being described with reference to FIG. 1 through FIG. 7B. The system 100 is used for generating an identity for a subject based on its association and status of association with an organization 106. The system 100 is also used for verifying the generated identity. Referring to FIG. 1, the system 100 comprises an identity generation tool 104, an identity verification tool 110, and a validating server 112. The identity generation tool 104 is installable in a first electronic device 102 associated with the subject and is configured to facilitate generation of an ephemeral identity instance for the subject upon receiving a request for identity verification from a verifier. The identity generation tool 104 comprises a first repository 202 and an identity generation module 204 as shown in FIG. 2. The first repository 202 is configured to store subject's association record, a digital signature of the association record, and a secret value associated with the subject. The association record includes ID of the organization 106, user ID of the subject, and association details of the subject with the organization 106. The identity generation module 204 comprises a first token generator module 206 and a combining module 208. The first token generator module 206 is configured to cooperate with the first repository 202 to receive the secret value, and is further configured to feed the secret value and the current time-stamp to a pseudo random number generator as a seed to generate a first one-time token. The combining module 208 is configured to cooperate with the first repository 202 and the first token generator module 206 to receive and combine the association record, the digital signature, and the first one-time token to generate the identity instance for the subject. In an embodiment, the first electronic device 102 consists of a keyboard, a keypad, a touchscreen to facilitate generation of request for identity verification of the subject. In another embodiment, the first electronic device 102 facilitates generation of the identity verification request by means of a voice command.

In an embodiment, the organization 106 generates an asymmetric cryptographic key pair which has a Private key and a public key. The private key is used for signing any records which an organization 106 wants others to trust as authentic and untampered. The private keys are securely stored and not shared with anyone. In an embodiment, the association record is signed using the organization's 106 private key. Signing of association record is a cryptographic operation and involves encryption of hash of that association record with the organization's 106 private key. The hash values or hash is a fixed length digest for a given data of any arbitrary length which is generated using a cryptographic hash function. Signing of association record using organization's 106 private key results in generation of a digital signature. The digital signature of the subject's association record is provided to the subject by the organization 106 and is stored in the identity generation tool 104 of subject's electronic device 102.

The identity verification tool 110 is installable in a second electronic device 108 associated with the verifier and is configured to perform a first level authentication of the subject. The second electronic device 108 comprises a first transceiver 302 configured to receive the identity instance from the first electronic device 102 via a communication network. The communication network may be a mobile communication network or the internet.

In an embodiment, the identity instance is generated in the form of a QR code and the second electronic device 108 includes a scanning unit which scans the generated QR code to retrieve the identity instance. In another embodiment, the first electronic device 102 is configured to transmit the generated identity instance in the form of wireless signals. The first transceiver 302 is a wireless signal receiver selected from the group consisting a Bluetooth transceiver, a Wi-Fi transceiver, a LTE transceiver, an Ultra Wide Band transceiver, an Infrared transceiver, and a WiMAX transceiver.

Figure 3:
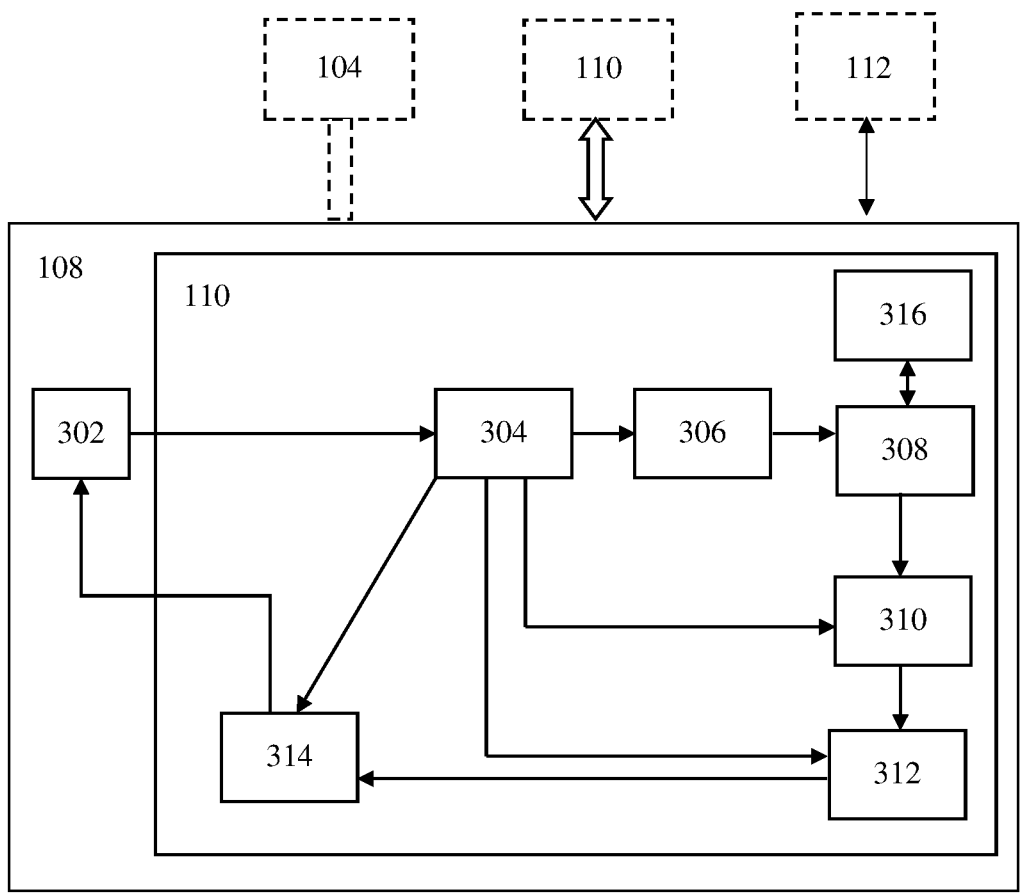
FIG. 3 illustrates a block diagram of an identity verification tool of the system of FIG. 1.

Referring to FIG. 3, the identity verification tool 110 comprises a second repository 316, a first extractor module 304, a second extractor module 306, a first crawler and extractor module 308, a decrypting module 310, a digital signature verification module 312, and a validity status requesting module 314. The second repository 316 is configured to store a first lookup table having a list of organizations IDs and associated public keys. The public keys are distributed by organizations 106 to a person or an organization which wishes to verify a record or data signed (i.e. verifier) using the corresponding private key. The first extractor module 304 is configured to cooperate with the first transceiver 302 to receive the identity instance, and is further configured to extract the association record, the digital signature, and the first one-time token from the identity instance. The second extractor module 306 is configured to cooperate with the first extractor module 304 to receive the extracted association record, and is further configured to extract organization ID of the subject from the received association record. The first crawler and extractor module 308 is configured to cooperate with the second extractor module 306 to receive the organization ID of organization 106 associated with the subject, and is further configured to crawl through the first lookup table of the second repository 316 to extract the public key of the organization 106. The decrypting module 310 is configured to cooperate with the first crawler and extractor module 308 and the first extractor module 304 to receive the extracted public key and the extracted digital signature respectively, and is further configured to decrypt the digital signature using the public key to generate a decrypted data. The digital signature verification module 312 is configured to cooperate with the decrypting module 310 and the first extractor module 304 to receive the decrypted data and the association record for the subject respectively, and is further configured to compare the decrypted data with hash values of the association record to verify the digital signature. The validity status requesting module 314 is configured to generate a validity status request upon successful verification of the digital signature, and is further configured to cooperate with the first extractor module 304 and the second extractor module 306 to transmit the organization ID, the user ID, the first one-time token, and the validity status request to a validating server 112 via the first transceiver 302 for verifying the current status of the association record. In an embodiment, the first extractor module 304, the second extractor module 306, the first crawler and extractor module 308, the decrypting module 310, the digital signature verification module 312, and the validity status requesting module 314 are implemented using one or more processors.

Figure 4:
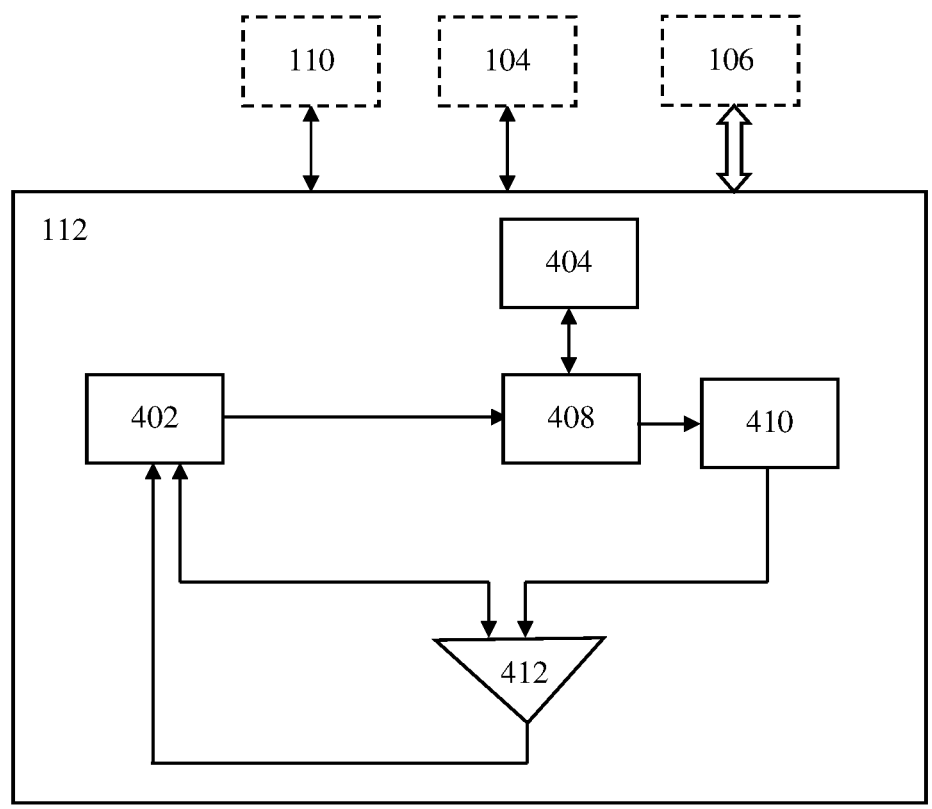
FIG. 4 illustrates a block diagram of a validating server of the system of FIG. 1.

The validating server 112 is communicatively coupled with the identity generation tool 104, the identity verification tool 110, and an identity server 106a associated with the organization 106. The validating server 112 is configured to perform a second level authentication of the subject and comprises a database 404, a second transceiver 402, a second crawler and extractor module 408, a second token generator module 410, and a comparator 412 as shown in FIG. 4. The database 404 is configured to store a second lookup table having a list of organization IDs, user IDs of subjects associated with the organizations 106 having said organization IDs, and secret values associated with said subjects. The second transceiver 402 is configured to receive the validity status request, the organization ID, the user ID, and the first one-time token from the validity status requesting module 314. The second crawler and extractor module 408 is configured to cooperate with the second transceiver 402 to receive the organization ID and user ID of the subject, and is further configured to cooperate with the database 404 to crawl through the second lookup table and extract secret value associated with the organization ID and user ID. The second token generator module 410 is configured to cooperate with the second crawler and extractor module 408 to generate a second one-time token using the current time stamp and the extracted secret value. The comparator 412 is configured to cooperate with the second token generator module 410 and the second transceiver 402 to receive the second one-time token and the first one-time token respectively, and is further configured to compare the second one-time token with the first one-time token to verify the validity status of the association record. The comparator 412 is also configured to communicate the validity status to the identity verification tool 110 via the second transceiver 402. In an embodiment, the second crawler and extractor module 408, the second token generator module 410, and the comparator 412 are implemented using one or more processors.

In an embodiment, the validating server 112 is configured to remove a subject's entry from the second lookup table of the database 404, if the association of organization 106 with the subject ends.

In an embodiment, the second electronic device 108 is configured to display digital signature verification and validity status of the subject to the verifier on a display screen.

In an embodiment, the identity server 106a is configured to store of a list of associated subjects, user IDs and association record of each of the subjects, secret values associated with each user ID, and head shots or photographs of each of the subjects.

In an embodiment, the identity verification tool 110 is configured to facilitate the verifier to generate an image verification request for the subject. The first transceiver 302 is configured to transmit the image verification request to the validating server 112. The validating server 112 is configured to obtain head shot or photograph of the subject from the identity server 106a and display the obtained headshot or photograph to the verifier to facilitate a third level identity verification of the subject.

In an alternate embodiment, the identity server 106a may be configured to store a revocation list. The organization 106 may be configured to populate the revocation list with public keys of the subjects who are no longer associated with the organization 106. The identity verification tool 110 may be configured to check the revocation list to verify the validity status of the digital signature associated with a subject.

Figure 5A:
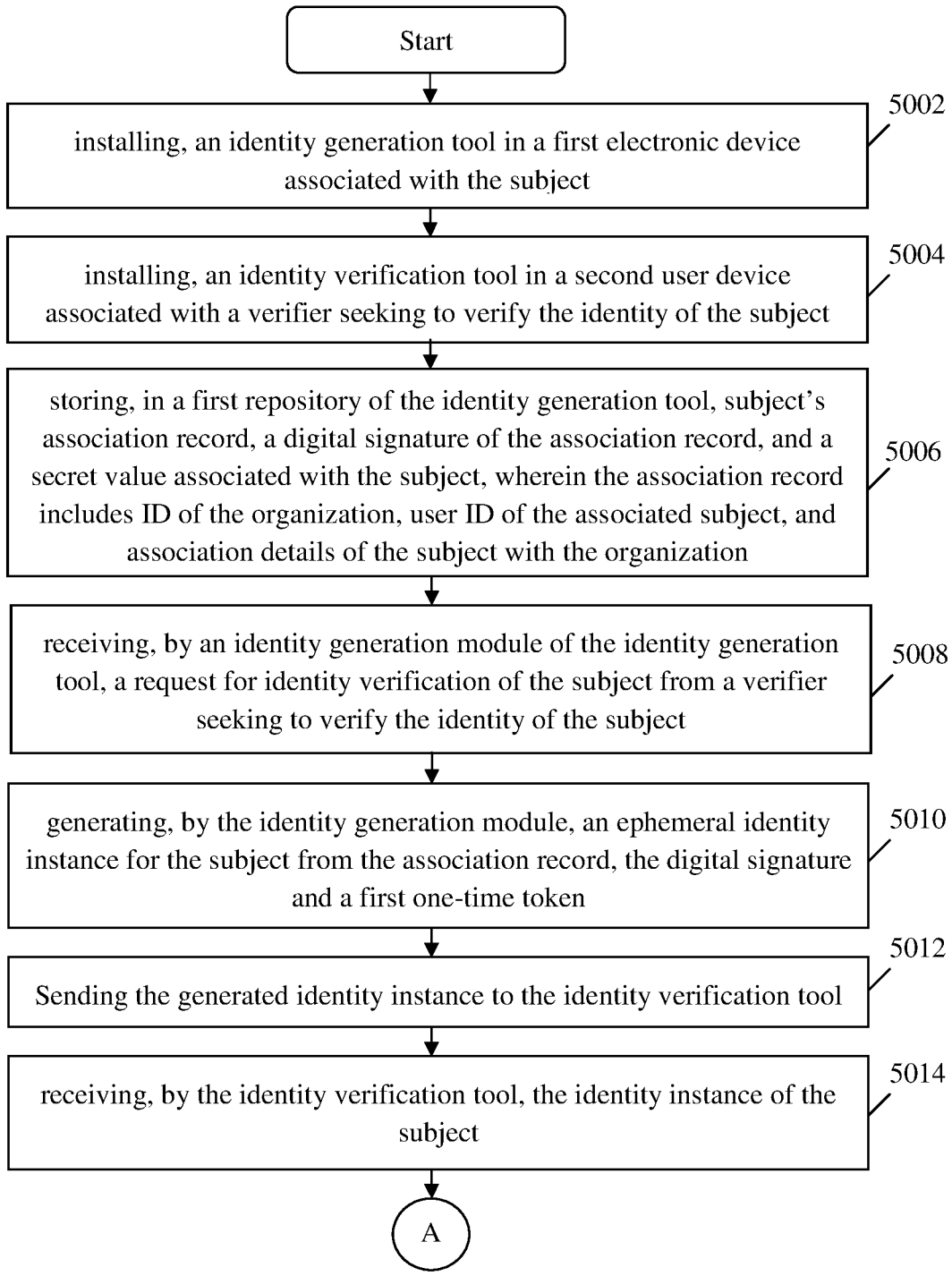
FIGS. 5A and 5B illustrate a flow diagram depicting a method for generation and verification of identity of a subject.
Figure 5B:
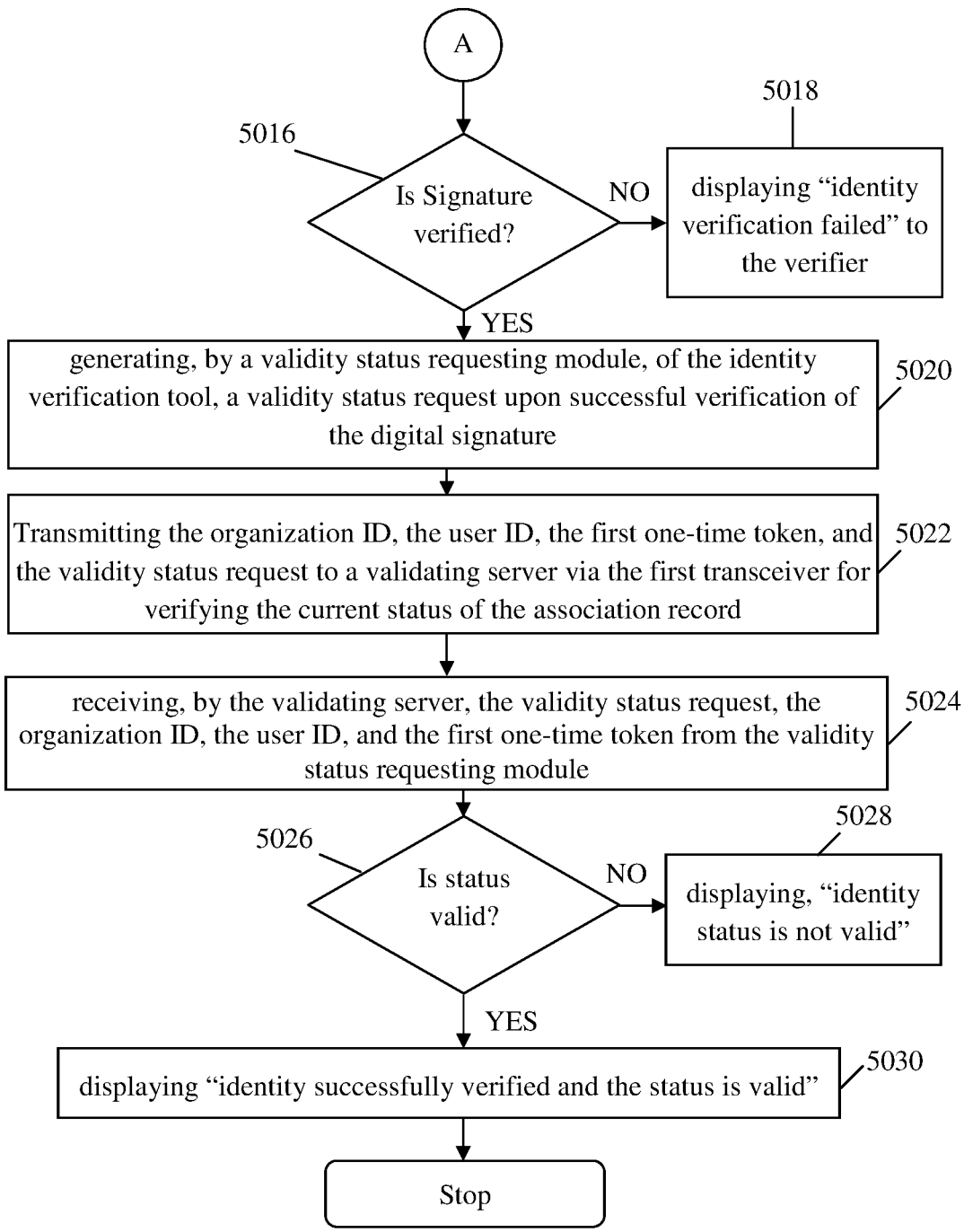

The present disclosure also envisages a method for generation and verification of identity of a subject using the system 100 described above. The subject is associated with an organization 106. Referring to FIGS. 5A & 5B, the method of identity generation and verification comprises the following steps:

Step 5002: installing, an identity generation tool 104 in a first electronic device 102 associated with the subject;

Step 5004: installing, an identity verification tool 110 in a second electronic device 108 associated with a verifier seeking to verify the identity of the subject;

Step 5006: storing, in a first repository 202 of the identity generation tool 104, subject's association record, a digital signature of the association record, and a secret value associated with the subject, wherein the association record includes ID of the organization 106, user ID of the associated subject, and association details of the subject with the organization 106;

Step 5008: receiving, by an identity generation module 204 of the identity generation tool 104, a request for identity verification of the subject from a verifier seeking to verify the identity of the subject;

Step 5010: generating, by the identity generation module 204, an ephemeral identity instance for the subject from the association record, the digital signature and a first one-time token;

Step 5012: sending, by the first electronic device 102, the generated identity instance to the identity verification tool 110;

Step 5014: receiving, by the identity verification tool 110, the identity instance of the subject;

Step 5016: verifying, by the identity verification tool 110, the digital signature of the subject's associated record;

Step 5020: if the digital signature is verified, generating, by a validity status requesting module 314, of the identity verification tool 110, a validity status request, upon successful verification of the digital signature;

Step 5022: transmitting, by the validity status requesting module 314, organization ID, the user ID, the first one-time token, and the validity status request to a validating server 112 via the first transceiver 302 for verifying the current status of the association record;

Step 5024: receiving, by the validating server 112, the validity status request, the organization ID, the user ID, and the first one-time token from the validity status requesting module 314;

Step 5026: verifying, by the validating server 112, the validity status of the association record Step 5030: if the status of the association record is found to be valid, displaying "identity successfully verified and the status is valid", Step 5028: otherwise, displaying, "identity status is not valid"; and Step 5018: if the digital signature is not verified, displaying "identity verification failed" to the verifier.

In an embodiment, the step 5010 of generating, by the identity generation module 204, an ephemeral identity instance comprises the following sub-steps:

1. receiving, by a first token generator module 206, the secret value from the repository;
2. feeding, by the first token generator module 206, the secret value and the current time-stamp to a pseudo random number generator to generate the first one-time token;
3. receiving, by a combining module 208, the association record, the digital signature and the first one-time token from the repository and the first token generator module 206; and
4. generating, by the combining module 208, an ephemeral identity instance for the subject from the association record, the digital signature and the first one-time token.

Figure 6A:
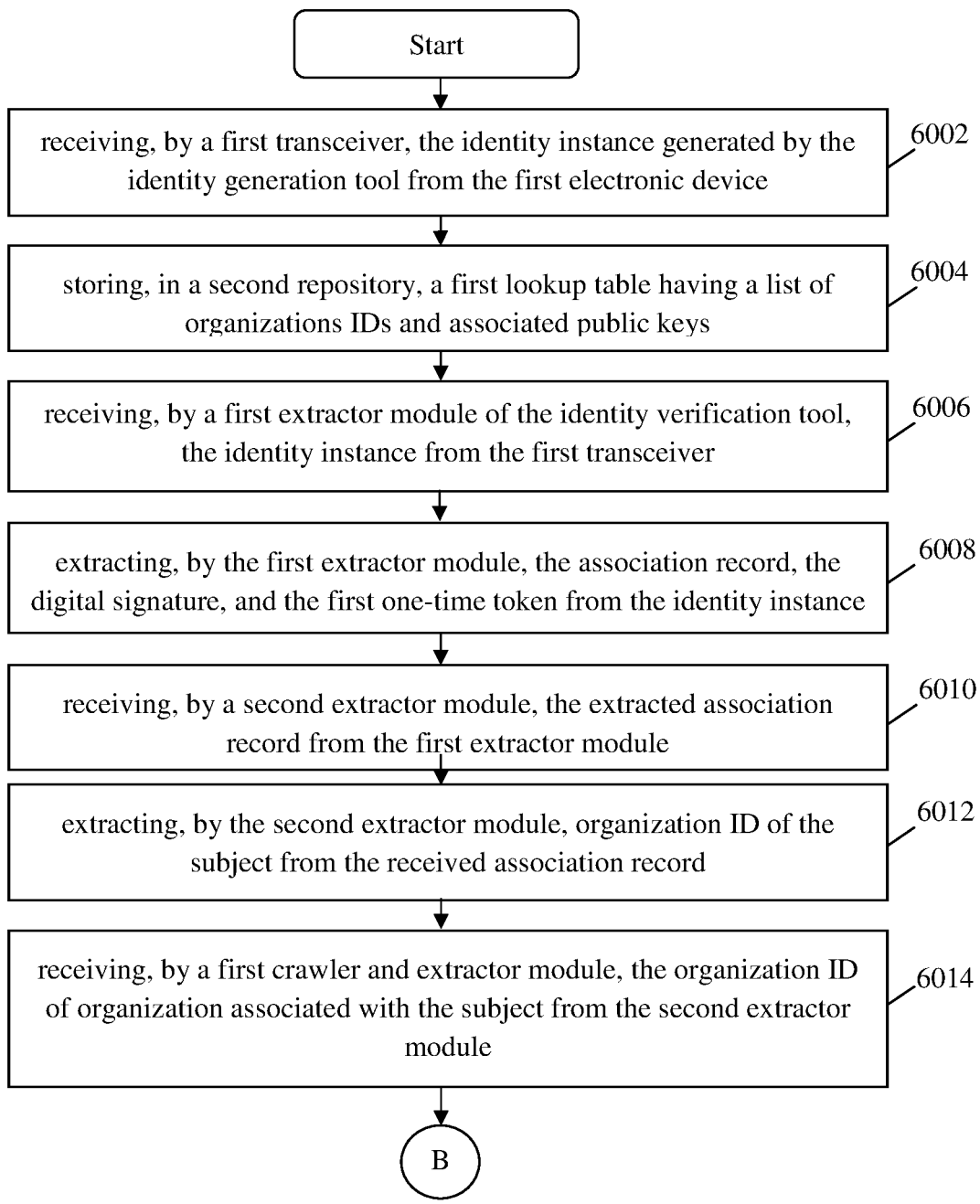
FIGS. 6A and 6B illustrate a flow diagram depicting the steps involved in verifying a digital signature of the method of FIGS. 5A and 5B.
Figure 6B:
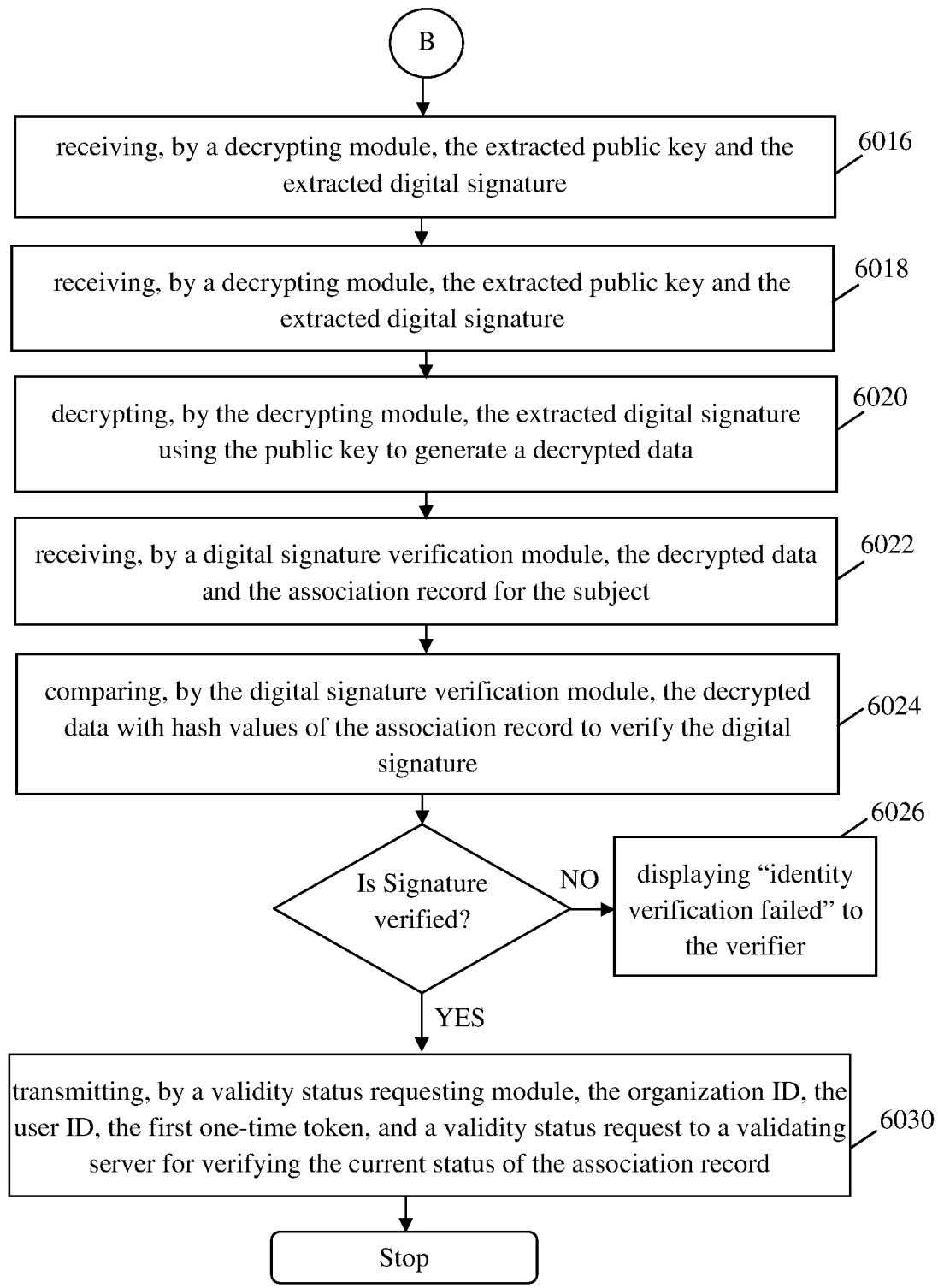

Referring to FIGS. 6A & 6B, the step 5016 of verifying, by the identity verification tool 110, the digital signature of the subject's associated record, comprises the following sub-steps:

Step 6002: receiving, by a first transceiver 302 of the second electronic device 108, the identity instance generated by the identity generation tool 104 from the first electronic device 102;

Step 6004: storing, in a second repository 316, a first lookup table having a list of organizations IDs and associated public keys;

Step 6006: receiving, by a first extractor module 304, the identity instance from the first transceiver 302;

Step 6008: extracting, by the first extractor module 304, the association record, the digital signature, and the first one-time token from the identity instance;

Step 6010: receiving, by a second extractor module 306, the extracted association record from the first extractor module 304;

Step 6012: extracting, by the second extractor module 306, organization ID of the subject from the received association record;

Step 6014: receiving, by a first crawler and extractor module 308, the organization ID of organization 106 associated with the subject from the second extractor module 306;

Step 6016: crawling, by the first crawler and extractor module 308, through the first lookup table of the second repository 316 to extract the public key of the organization 106;

Step 6018: receiving, by a decrypting module 310, the extracted public key and the extracted digital signature from the first crawler and extractor module 308 and the first extractor module 304 respectively;

Step 6020: decrypting, by the decrypting module 310, the extracted digital signature using the public key to generate a decrypted data;

Step 6022: receiving, by a digital signature verification module 312, the decrypted data and the association record for the subject from the decrypting module 310 and the first extractor module 304 respectively;

Step 6024: comparing, by the digital signature verification module 312, the decrypted data with hash values of the association record to verify the digital signature;

Step 6030: if the digital signature is verified, transmitting, by a validity status requesting module 314, the association record, the first one-time token, and a validity status request to a validating server 112 for verifying the current status of the association record, Step 6026: otherwise, displaying "identity verification failed".

Figure 7A:
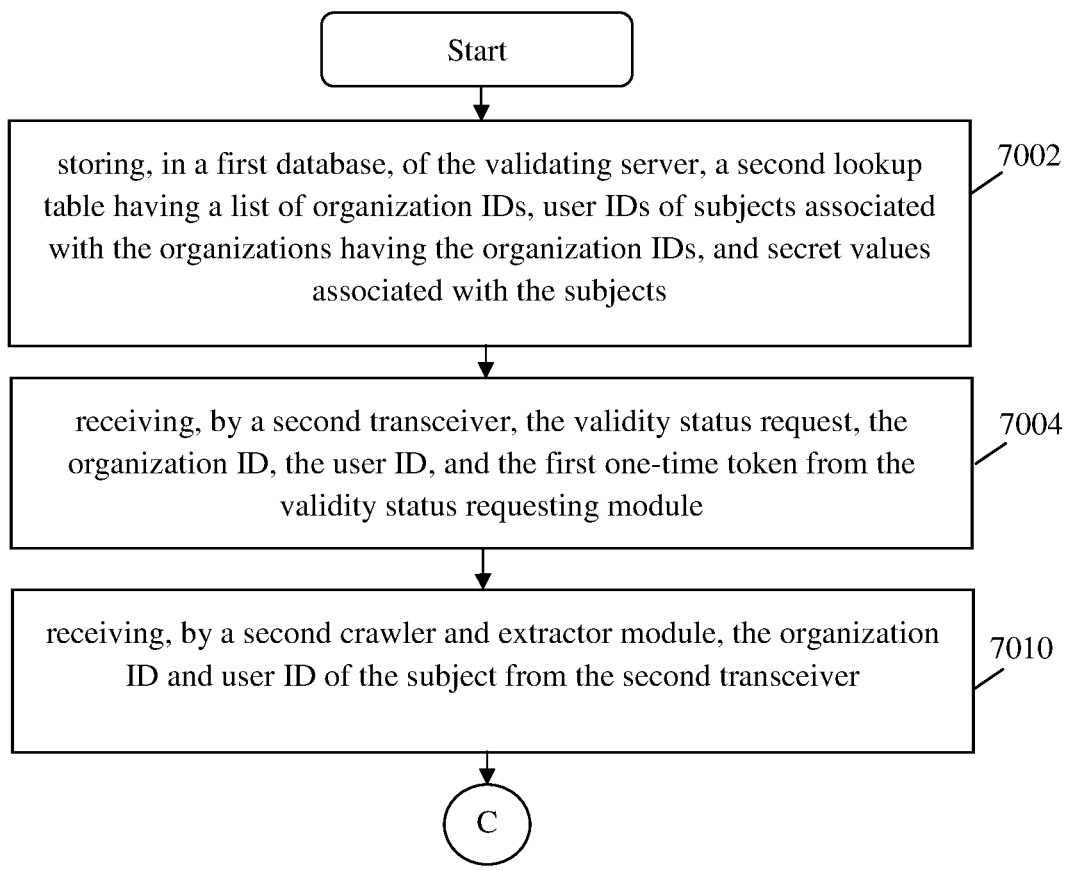
FIGS. 7A and 7B illustrate a flow diagram depicting steps involved in verifying the status of validity of the association record of the method of FIGS. 5A and 5B.
Figure 7B:
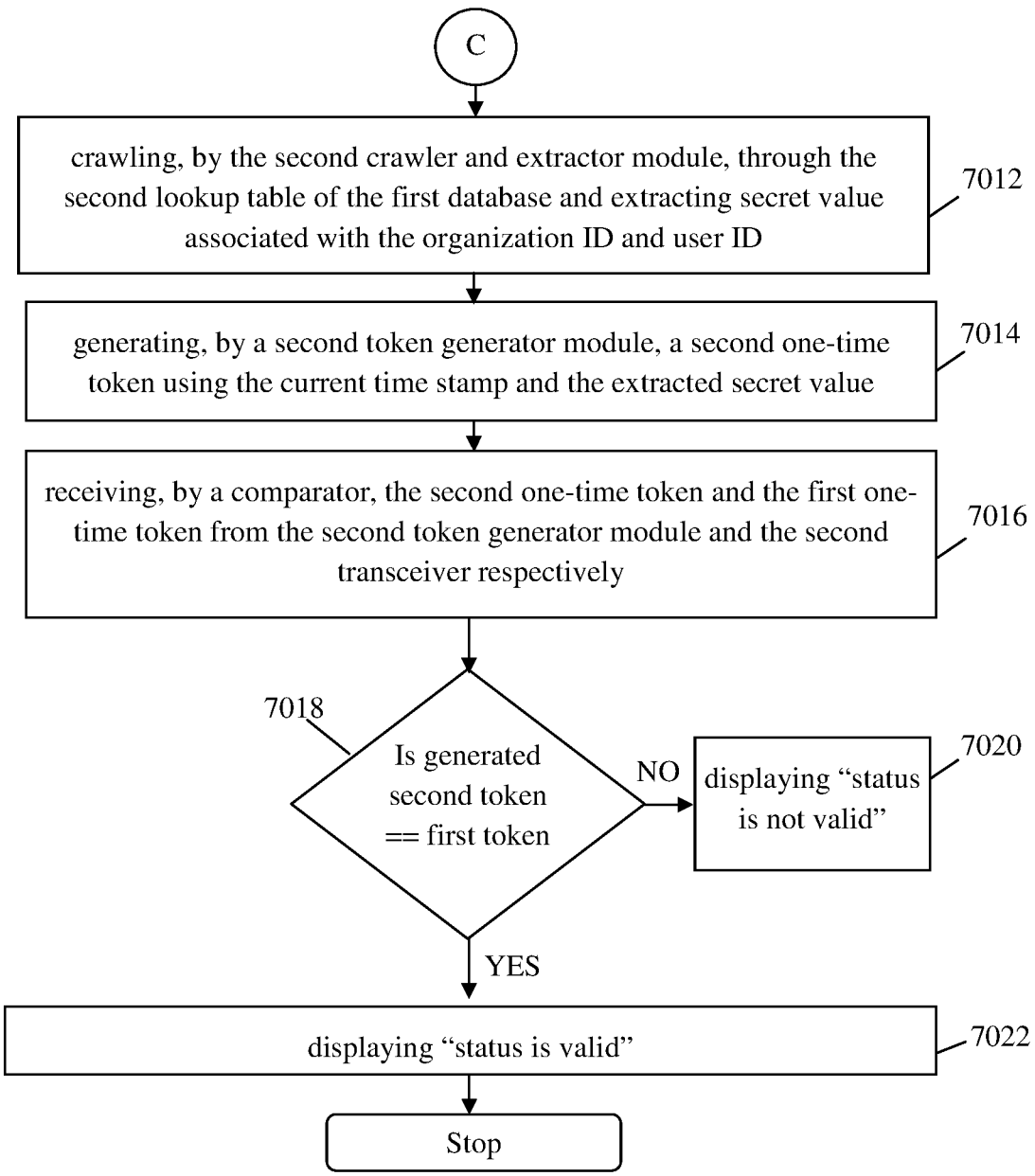

Referring to FIGS. 7A & 7B, the step 5026 of verifying, by the validating server 112, the validity status of the association record comprises the following sub-steps:

Step 7002: storing, in a database 404, a second lookup table having a list of organization IDs, user IDs of subjects associated with the organizations 106 having said organization IDs, and secret values associated with the subjects;

Step 7004: receiving, by a second transceiver 402, the validity status request, the organization ID, the user ID, and the first one-time token from the validity status requesting module 314;

Step 7010: receiving, by a second crawler and extractor module 408, the organization ID and user ID of the subject from the second transceiver 402;

Step 7012: crawling, by the second crawler and extractor module 408, through the second lookup table of the database 404 and extracting secret value associated with the organization ID and user ID;

Step 7014: generating, by a second token generator module 410, a second one-time token using the current time stamp and the secret value extracted from the second crawler and extractor module 408;

Step 7016: receiving, by a comparator 412, the second one-time token and the first one-time token from the second token generator module 410 and the second transceiver 402 respectively;

Step 7018: comparing, by the comparator 412, the second one-time token with the first one-time token to verify the validity status of the association record;

Step 7022: if the first tone-time token is same as the second one-time token, displaying "status is valid", otherwise, Step 7020: displaying "status is not valid".

The identity instance generated for a subject on his/her electronic device is ephemeral which means that a new and different identity instance is generation in each verification session. Thus, the identity instance of the subject is protected from being replayed or used by forging subject's information. Further, the dynamic identity can be carried by a person in his/her mobile device and protected by his/her biometrics or password. Dynamic identity generation logic can also be embedded in devices like vending machines, drones, vehicles, unmanned vehicles, robots which need to be identified securely and reliably. Thus, the system 100 can be employed for multiway identification applications such as—

1. human verifies humans: people can identity/authenticate each other using their electronic devices.
2. human verifies machines: humans can reliably identity machines like robots or unmanned vehicles using their dynamic identity instance.
3. machine verifies humans: machines like access controllers and printers can identity humans based on the identity generated by their electronic devices and grant them access.
4. machine verifies machines: Identity data can be transmitted and received over signals between machines and can be reliably verified. For example, robots can verify vending machines before stocking them.

Further, as the system 100 uses digitally signed data describing association between a subject and an organization, it can be used to verify current and historical employment records. An identity instance can be shared as a QR code by a subject on his/her social networking account, which can be verified and validated by employers. The association based identity data broadcasted by devices can be used for proving the ownership of devices if implemented through a tamper evident mechanism. The association based identity can also be used by a user to login in to the online services by proving its identity at a designated destination. If a stolen device is used for identity presentation, it can be traced and tracked. The logs of identity presentation and verification during interaction between two entities can be used as a non-repudiable proof of interaction.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

Technical Advancements

The present disclosure described herein above has several technical advantages including, but not limited to, the realization of a system and method for generation and verification of identity that:

is non-forgeable;
prevents unauthorized duplication of identity;
is universally verifiable;
is cost effective;
allows easy updation of a subject's identity;
allows the subject to protect his/her identity;
is fast and accurate;
has minimum failure rate; and
can be used for logging in to any platform which can verify the subject's credentials.

The embodiments herein and the various features and advantageous details thereof are explained with reference to the non-limiting embodiments in the following description.

Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A system for generation and verification of identity of a subject associated with an organization, said system comprising:
   an identity generation tool installable in a memory of a first electronic device associated with said subject, said identity generation tool configured to facilitate generation of an ephemeral identity instance for said subject upon receiving a request for identity verification from a verifier, said identity generation tool comprising:
   i. a first repository configured to store subject's association record, a digital signature of said association record, and a secret value associated with said subject, wherein said association record includes ID of said organization, user ID of said subject, and association details of said subject with said organization;
   and ii. an identity generation module comprising:
   a first token generator module configured to cooperate with said first repository to receive said secret value, and further configured to feed said secret value and the current time-stamp to a pseudo random number generator as a seed to generate a first one-time token;
   and iii. a combining module configured to cooperate with said first repository and said first token generator module to receive and combine said association record, said digital signature, and said first one-time token to generate said identity instance for said subject,
   an identity verification tool installable in a memory of a second electronic device associated with said verifier, said second electronic device comprising a first transceiver configured to receive said identity instance from said first electronic device, said identity verification tool configured to perform a first level authentication of said subject, said identity verification tool comprising:
   i. a second repository configured to store a first lookup table having a list of organizations IDs and associated public keys;
   ii. a first extractor module configured to cooperate with said first transceiver to receive said identity instance, and further configured to extract said association record, said digital signature, and said first one-time token from said identity instance;
   iii. a second extractor module configured to cooperate with said first extractor module to receive said extracted association record, and further configured to extract organization ID of said subject from said received association record;
   iv. a first crawler and extractor module configured to cooperate with said second extractor module to receive said organization ID of organization associated with said subject, and further configured to crawl through said first lookup table of said second repository to extract the public key of said organization;
   v. a decrypting module configured to cooperate with said first crawler and extractor module and said first extractor module to receive said extracted public key and said extracted digital signature respectively, and further configured to decrypt said digital signature using said public key to generate a decrypted data;
   vi. a digital signature verification module configured to cooperate with said decrypting module and said first extractor module to receive said decrypted data and said association record for said subject respectively, and further configured to compare said decrypted data with hash values of said association record to verify said digital signature; and
   vii. a validity status requesting module configured to generate a validity status request upon successful verification of said digital signature, and further configured to cooperate with said first extractor module and said second extractor module to transmit said organization ID, said user ID, said first one-time token, and said validity status request to a validating server via said first transceiver for verifying the current status of said association record, wherein said first extractor module, said second extractor module, said first crawler and extractor module, said decrypting module, said digital signature verification module, and said validity status requesting module are implemented using one or more processors,
   and said validating server, comprising a memory and a processor, communicatively coupled with said identity generation tool, said identity verification tool, and an identity server associated with said organization, said validating server configured to perform a second level authentication of said subject, said validating server comprising:
   i. a database configured to store a second lookup table having a list of organization IDs, user IDs of subjects associated with the organizations having said organization IDs, and secret values associated with said subjects;
   ii. a second transceiver configured to receive said validity status request, said organization ID, said user ID, and said first one-time token from said validity status requesting module;
   iii. a second crawler and extractor module configured to cooperate with said second transceiver to receive said organization ID and user ID of said subject, and further configured to cooperate with said database to crawl through said second lookup table and extract secret value associated with said organization ID and user ID;

iv. a second token generator module configured to cooperate with said second crawler and extractor module to generate a second one-time token using the current time stamp and said extracted secret value;

and v. a comparator configured to cooperate with said second token generator module and said second transceiver to receive said second one-time token and said first one-time token respectively, and further configured to compare said second one-time token with said first one-time token to verify the validity status of said association record, said comparator configured to communicate said validity status to said identity verification tool via said second transceiver, wherein said second crawler and extractor module, said second token generator module, and said comparator are implemented using one or more processors.

2. The system as claimed in claim 1, wherein said identity instance is generated in the form of a QR code.

3. The system as claimed in claim 2, wherein said second electronic device includes a scanning unit configured to scan said QR code to receive said identity instance.

4. The system as claimed in claim 1, wherein said first electronic device is configured to transmit said generated identity instance in the form of wireless signals.

5. The system as claimed in claim 1, wherein said first transceiver is a wireless signal receiver selected from the group consisting a Bluetooth transceiver, a Wi-Fi transceiver, a LTE transceiver, an Ultra Wide Band transceiver, an Infrared transceiver, and a WiMAX transceiver.

6. The system as claimed in claim 1, wherein said second electronic device is configured to display digital signature verification and validity status of said subject to said verifier.

7. The system as claimed in claim 1, wherein said identity server is configured to store of a list of associated subjects, user IDs and association record of each of said subjects, secret values associated with each user ID, and head shots or photographs of each of said subjects.

8. The system as claimed in claim 7, wherein said validating server is further configured to obtain head shot or photograph of said subject from said identity server to facilitate a third level identity verification of said subject.

9. A method for generation and verification of identity of a subject associated with an organization, said method comprising the following steps:

installing, an identity generation tool in a first electronic device associated with said subject;

installing, an identity verification tool in a second electronic device associated with a verifier seeking to verify the identity of said subject;

storing, in a first repository of said identity generation tool, subject's association record, a digital signature of said association record, and a secret value associated with said subject, wherein said association record includes ID of said organization, user ID of said associated subject, and association details of said subject with said organization;

receiving, by an identity generation module of said identity generation tool, a request for identity verification of said subject from a verifier seeking to verify the identity of said subject;

generating, by said identity generation module, an ephemeral identity instance for said subject from said association record, said digital signature and a first one-time token;

sending, by said first electronic device, said generated identity instance to said identity verification tool;

receiving, by said identity verification tool, said identity instance of said subject;

verifying, by said identity verification tool, said digital signature of said subject's associated record;

if the digital signature is verified:

i. generating, by a validity status requesting module, of said identity verification tool, a validity status request upon successful verification of said digital signature;

ii. transmitting, by said validity status requesting module, said organization ID, said user ID, said first one-time token, and said validity status request to a validating server via said first transceiver for verifying the current status of said association record;

iii. receiving, by said validating server, said validity status request, said organization ID, said user ID, and said first one-time token from said validity status requesting module;

iv. verifying, by said validating server, the validity status of said association record; and v. if the status of said association record is found to be valid, displaying "identity successfully verified and the status is valid" otherwise, displaying, "identity status is not valid"; and if the digital signature is not verified, displaying "identity verification failed" to said verifier.

10. The method as claimed in claim 9, wherein said step of generating, by said identity generation module, an ephemeral identity instance comprises the following sub-steps:

receiving, by a first token generator module, said secret value from said repository;

feeding, by said first token generator module, said secret value and the current time-stamp to a pseudo random number generator to generate said first one-time token;

receiving, by a combining module, said association record, said digital signature and said first one-time token from said repository and said first token generator module; and generating, by said combining module, an ephemeral identity instance for said subject from said association record, said digital signature and said first one-time token.

11. The method as claimed in claim 9, wherein said step of verifying, by said identity verification tool, said digital signature of said subject's associated record comprises the following sub-steps:

receiving, by a first transceiver of said second electronic device, said identity instance generated by said identity generation tool from said first electronic device;

storing, in a second repository, a first lookup table having a list of organizations IDs and associated public keys;

receiving, by a first extractor module, said identity instance from said first transceiver;

extracting, by said first extractor module, said association record, said digital signature, and said first one-time token from said identity instance;

receiving, by a second extractor module, said extracted association record from said first extractor module;

extracting, by said second extractor module, organization ID of said subject from said received association record;

receiving, by a first crawler and extractor module, said organization ID of organization associated with said subject from said second extractor module;

crawling, by said first crawler and extractor module, through said first lookup table of said second repository to extract the public key of said organization;

receiving, by a decrypting module, said extracted public key and said extracted digital signature from said first crawler and extractor module and said first extractor module respectively;

decrypting, by said decrypting module, said extracted digital signature using said public key to generate a decrypted data;

receiving, by a digital signature verification module, said decrypted data and said association record for said subject from said decrypting module and said first extractor module respectively; and comparing, by said digital signature verification module, said decrypted data with hash values of said association record to verify said digital signature.

12. The method as claimed in claim 9, wherein said step of verifying, by said validating server, the validity status of said association record comprises the following sub-steps:

storing, in a database, a second lookup table having a list of organization IDs, user IDs of subjects associated with the organizations having said organization IDs, and secret values associated with said subjects;

receiving, by a second transceiver, said validity status request, said organization ID, said user ID, and said first one-time token from said validity status requesting module;

receiving, by a second crawler and extractor module, said organization ID and user ID of said subject from said second transceiver;

crawling, by said second crawler and extractor module, through said second lookup table of said database and extracting secret value associated with said organization ID and user ID;

generating, by a second token generator module, a second one-time token using the current time stamp and said secret value extracted from said second crawler and extractor module;

receiving, by a comparator, said second one-time token and said first one-time token from said second token generator module and said second transceiver respectively;

comparing, by said comparator, said second one-time token with said first one-time token to verify the validity status of said association record; and communicating, by said comparator, said validity status with said identity verification tool via said second transceiver.

\* \* \* \* \*